Figure 1:
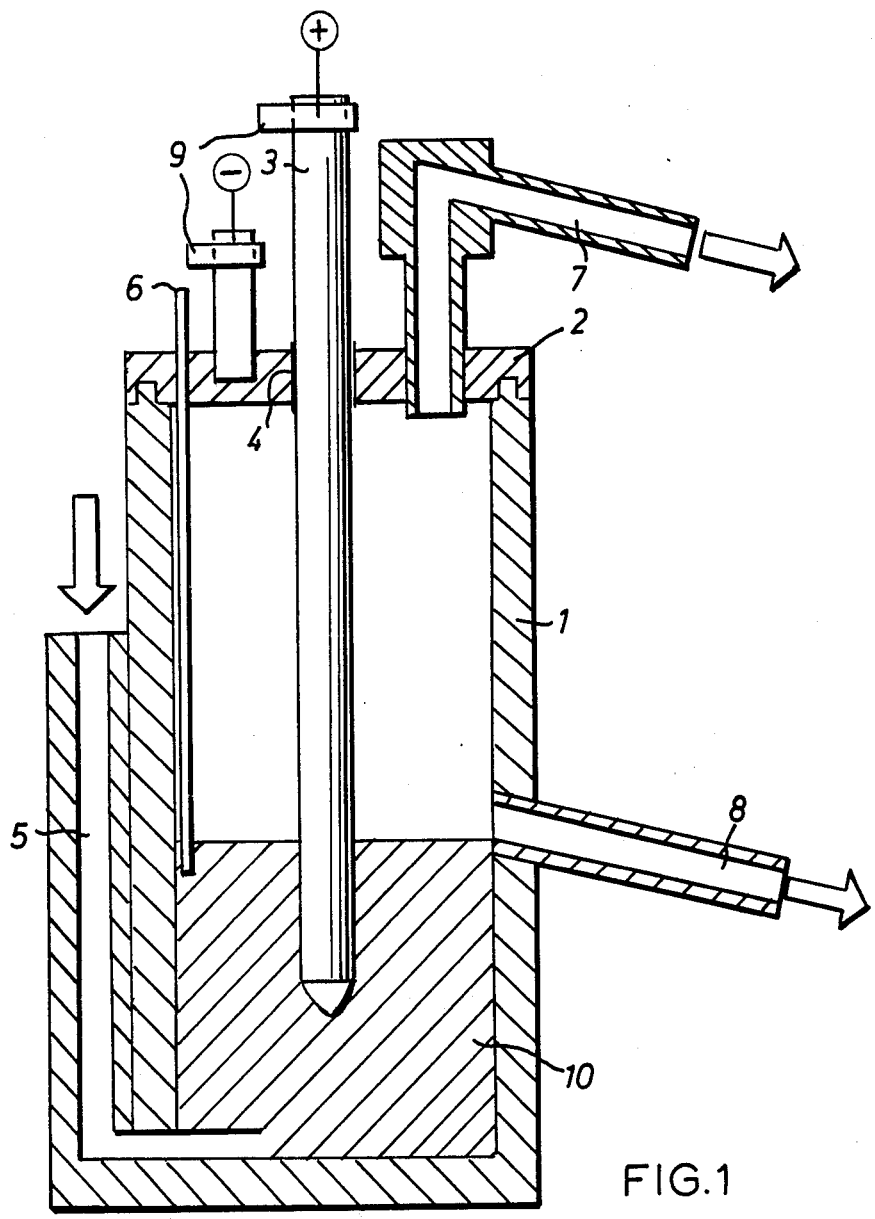

United States Patent [19]

Lowe et al.

[11] 4,215,098

[45] Jul. 29, 1980

[54] PURIFICATION OF WET PROCESS PHOSPHORIC ACID

[75] Inventors: Edward J. Lowe; Arthur Wilson, both of Stourbridge; Michael W. Minshall, Wombourne, all of England

[73] Assignee: Albright & Wilson Limited, West Midlands, England

[21] Appl. No.: 899,896

[22] Filed: Apr. 26, 1978

[51] Int. Cl.² ................. C01B 25/40; C01B 25/16; B01D 1/00

[52] U.S. Cl. ................................. 423/305; 23/307; 159/17 R; 159/29; 423/321 R

[58] Field of Search ............ 423/321 R, 305; 23/307

[56] References Cited

U.S. PATENT DOCUMENTS

| 3,317,306 | 5/1967 | Getsinger . | |
|---|---|---|---|
| 3,499,729 | 3/1970 | Maunsell . | |
| 3,664,929 | 5/1972 | White . | |
| 3,764,655 | 10/1973 | Ehlers . | |
| 3,912,803 | 12/1976 | Williams et al. . | |
| 3,991,164 | 11/1976 | Scheibitz et al. | 423/321 R |
| 4,048,289 | 9/1977 | Pierres | 423/321 R |
| 4,083,934 | 1/1977 | Jernigan . | |

FOREIGN PATENT DOCUMENTS

| 0865710 | 3/1971 | Canada . |
| 1057643 | 2/1967 | United Kingdom . |
| 1081891 | 9/1967 | United Kingdom . |
| 1081892 | 9/1967 | United Kingdom . |
| 1081894 | 9/1967 | United Kingdom . |

Primary Examiner—Wayne A. Langel
Attorney, Agent, or Firm—Frishauf, Holtz, Goodman & Woodward

[57] ABSTRACT

Wet process phosphoric acid is heated, preferably in carbon apparatus, by passing alternating current through the acid, to concentrations above 80% $P_2O_5$ and preferably temperatures above 500° C. to remove sulphate and fluoride and convert organic and basic impurities into a filterable precipitate: the acid is separated from the precipitate to provide a high purity crystallizable product.

25 Claims, 2 Drawing Figures

PURIFICATION OF WET PROCESS PHOSPHORIC ACID

The present invention relates to the purification of wet process phosphoric acid.

Wet process phosphoric acid is manufactured by the reaction of an aqueous acid with calcium phosphate rock. The acid used in commercial practice is sulphuric acid which forms a dilute phosphoric acid of about 30% by weight $P_2O_5$ concentration, together with a precipitate of calcium sulphate. After filtration, the product acid is heavily contaminated with sulphate, fluorine compounds, organic matter, arsenic and various basic impurities including iron, aluminium and magnesium. Because of the high level of contamination, wet process phosphoric acid is unsuitable for many of the major commercial uses of phosphoric acid. Such uses require the higher purity of thermal acid, a product made by the much more expensive electric reduction process which involves reducing the phosphate rock in an electric arc furnace to elemental phosphorus, which is oxidised to $P_2O_5$ and dissolved in water to provide relatively pure phosphoric acid of any desired concentration.

Many attempts have been made to concentrate and/or purify wet process acid to obtain a product of greater overall utility. In practice the most commonly used method is to heat the acid under vacuum to distill off water. Because of the physical and chemical limitations of the system the maximum concentration obtainable by this method without serious problems is about 60% by weight $P_2O_5$. This represents the normal commercial concentration of wet process acid. Moreover, this commercial wet process acid contains all but the most highly volatile of the original impurities in a more concentrated form than the original dilute acid.

Proposals for concentrating wet process acids to higher concentrations have included various methods of indirect heating, via heat exchange surfaces, or of direct heating by submerged combustion. Such methods have not succeeded in preparing residual acids more concentrated than about 65 to 75% $P_2O_5$ because of the formation of metaphosphates of the basic impurities which deposit on any heat exchange surfaces as a scale, and which render the pool of residual acid too vicous to handle commercially. The acid, moreover becomes increasingly discoloured. These problems become progressively more severe as the acid is heated to concentrations above 70% $P_2O_5$.

Moreover when water is evaporated from phosphoric acid, some $P_2O_5$ tends to distil with the water and may be lost from the system. It also presents a potential pollution hazard, necessitating expensive scrubbing operations, which, however, do not provide economical recovery of the $P_2O_5$ since the scrubbings are usually heavily contaminated with volatile impurities, such as fluorine compounds. This factor has also contributed to the difficulties of heating phosphoric acid to concentrations above 70% $P_2O_5$.

The highly viscous, intractable and impure nature of wet process phosphoric acid whenever concentrated above about 70%, and the difficulties of fume emission, have hitherto precluded any serious investigation of derivatives more concentrated than about 75% $P_2O_5$ and led to a general assumption in the art that it is impractical to obtain more concentrated derivatives at least as commercially useful products, starting from wet process acid.

Canadian Pat. No. 865710 describes a method of concentrating wet process phosphoric acid by direct electrical resistance heating, passing through the solution an alternating electric current capable of heating the solution sufficiently to evaporate water therefrom. The aforesaid Canadian Patent refers to the possibility of concentrating wet process acid above 60% $P_2O_5$, to concentrations corresponding to polyphosphoric acid e.g. 82% or even higher. However, this disclosure can be seen to be speculative, since the highest concentration described in the specification as having been attained in any example is 72.5%, and since the apparatus described in the specification and used in all the examples could not have attained significantly higher concentration. This is because the bricks from which the vessel was constructed are known to be unable to withstand the high temperatures and corrosive conditions associated with boiling phosphoric acid having concentrations higher than about 75% $P_2O_5$ or above at atmospheric pressure. No utility is suggested in the aforesaid specification, or is known for any polyphosphoric acid of such high concentration prepared from wet process acid as distinct from those derived from thermal acid by addition of $P_2O_5$ thereto. It would not be expected that such concentrated derivatives of wet process acid would be of any practical use, because it is well known that concentrating wet process phosphoric acid also concentrates the less volatile impurities, especially basic impurities, as well as organic matter and sulphate, until the acid develops a toffee-like consistency, which apparently precludes the possibility of it ever being of commercial value.

We have now attempted to concentrate wet process phosphoric acid by direct electrical resistance heating, using an improved apparatus capable of operating at temperatures in excess of the boiling point of 80% $P_2O_5$ acid. In this way we found, as expected, that at concentrations in the range 65–70% the viscosity rose sharply and there was evidence of the formation of metaphosphates, discolouration of the acid and increasing loss of $P_2O_5$ in fumes. Nevertheless, we continued heating to concentrations above 80% by weight. $P_2O_5$. Surprisingly, we discovered that at concentrations above about 76% $P_2O_5$ (i.e. about 320° C. at atmospheric pressure) a number of unexpected changes were observed: the trend of increasing discolouration from dark green to dark brown with increasing concentration is reversed in that at about 80% $P_2O_5$ the acid reverts to being a bright green liquid; above about 82% $P_2O_5$ (i.e. about 500° C. at atmospheric pressure) the basic impurities begin to settle out as a filterable sludge of metaphosphate, which, on removal, leaves a mobile product liquid; the sulphate ion, normally regarded as an involatile contaminant, begins to volatilise from the acid above 76% $P_2O_5$ concentration leaving a substantially desulphated acid at about 80% $P_2O_5$, or about 450° C. at atmospheric pressure; the organic impurities are carbonised above 76% $P_2O_5$ to leave filterable particles of carbon which may, possibly, contribute to the purification of the acid by absorption of impurities; and the arsenic is reduced by the carbon to a lower valency state in which it is more easily removed from the system e.g. by reaction with added chloride.

As a cumulative result of the foregoing changes, we have discovered, contrary to the general beliefs of those skilled in the art, that a useful, handlable polyphosphoric acid product of substantially increased purity, and concentrations in the range 80 to 86% $P_2O_5$, can readily be obtained from wet process acid.

For example, we have discovered that the product acid can be readily diluted to intermediate dilutions, e.g. in the range 50 to 75% $P_2O_5$ at which the cold acid can easily be filtered to remove the carbon and precipitated impurities, leaving a final product acid of greatly improved quality compared with that obtained by concentrating wet process phosphoric acid directly to the equivalent final concentration as taught in the prior art. In particular we have discovered that acid formed by the dilution of our polyphosphoric acid product to appropriate concentrations can be crystallised to provide highly pure ortho or condensed phosphoric acids. This has not hitherto been possible with evaporated wet process phosphoric acid in the absence of additional purification steps. The acid may alternatively be neutralised, e.g. with alkali metal or ammonium bases, either simultaneously with, or after, dilution, and either before or after filtration, to provide ortho-, pyro- or polyphosphates. Unlike ordinary concentrated wet process acid, our products show little or no tendency to post-precipitation.

Our invention therefore provides a method for the preparation of phosphatic derivatives of wet process phosphoric acid, which comprises heating wet process phosphoric acid, sufficiently to evaporate water therefrom until the acid has a concentration of at least 76% $P_2O_5$ by weight and deposit a filterable sludge of solid impurities, and separating the diluted solution from the solid impurities. Preferably the acid is heated by passing an alternating electric current therethrough. Preferably the concentrated acid is diluted to less than 75% by weight $P_2O_5$ and solid impurities are removed from the acid by filtration. Optionally, phosphatic products may be obtained from the acid, purified and concentrated according to our invention, by crystallising an orthophosphoric or condensed phosphoric acid from the diluted and filtered solution, or neutralising the acid with an alkali metal or ammonium base either simultaneously with or after dilution and either before, during or after separation of impurities.

Preferably the acid is heated to temperatures in excess of 320° C. e.g. greater than 400° C., most preferably greater than 500° C. For example temperatures in the range 550° C. to 650° C. are particularly convenient. It is usually convenient to evaporate the acid at substantially atmospheric pressure.

Our invention permits the preparation of phosphoric acid and phosphates having a purity intermediate between wet process and thermal acid, made by a process substantially cheaper and more convenient than the thermal process, or than other known ways of making a comparable intermediate purity acid, such as solvent extraction.

Heating is preferably carried out using a vessel and electrodes capable of withstanding the hot concentrated polyphosphoric acid, such as, preferably, carbon. Conveniently the vessel itself may constitute one electrode. In small scale equipment a central carbon rod may function as the other electrode. It is also possible, and may be preferred in large scale apparatus to have two or more carbon rods as the electrodes according to the phase of the current. The use of carbon, apart from its cost, has other advantages. Ablation of carbon particles from the electrode helps to minimise scaling on the electrode, and the carbon particles may contribute, with carbon formed from the organic material present, to the purification of the acid and the reduction of the arsenic.

The use of electrical heating in a carbon vessel largely overcomes problems of chemical attack on the vessel and heat exchange surfaces. For safety reasons, to avoid difficulties in insulating the vessel we prefer to use relatively low voltages, e.g. 30 to 100 volts, although very much higher voltages may be employed. The carbon is preferably graphite.

Product acid is preferably withdrawn through an overflow especially when an underflow feed inlet is used, but to avoid by-passing of the cell by the lighter feed acid, and accumulation of carbon sludge, an underflow outlet is preferred when an overhead feed inlet is used. Conveniently the underflow inlet (or outlet) may comprise a vertical channel in the cell wall, whose lower end opens into the cell and whose upper end opens to the exterior.

The wet process feed acid may be partially purified prior to heating, e.g. by any known process such as solvent extraction, dearsenification with sulphide, or desulphation, but the invention is operable, with particular economic benefits, using an unpurified wet process acid.

We have further discovered that when phosphoric acid is evaporated in a cascade of at least two evaporators, each evaporator operating at a higher temperature than the preceeding one in the cascade, the loss of $P_2O_5$ from the product acid, in evaporating to any given concentration, is substantially reduced.

Our invention, therefore, further provides a method of concentrating phosphoric acid which comprises continuously passing a dilute phosphoric acid successively through a plurality of evaporators, heating the acid in each successive evaporator to progressively higher temperatures sufficient to evaporate water from the acid in each evaporator and to increase progressively the concentration of the acid.

Preferably each evaporator in our further embodiment comprises a closed vessel provided with an outlet for vapour, means for adding feed acid, means for withdrawing more concentrated acid, and means for heating the acid, which in our preferred embodiment may comprise electrodes between which a sufficiently strong alternating current may be passed to heat the acid and evaporate water therefrom. Preferably, especially where the evaporator is to operate at relatively high temperatures, the vessel is of carbon as hereinbefore described. The feed acid may be, for example, wet process phosphoric acid, e.g. 30% wet process acid, thermal acid or a partially purified wet process acid such as solvent extracted acid.

The feed acid may be concentrated in stages up to 60% by weight $P_2O_5$ or higher, e.g. concentrations corresponding to polyphosphoric acids up to about 86% $P_2O_5$ at which phosphoric acid distils off. An advantage of the invention is that most of the volatile impurities are removed in the earlier stages, while the $P_2O_5$ losses occur mainly in the later stages permitting the $P_2O_5$ to be recovered separately from the volatile impurities. The liquid in the final evaporator in the cascade may be recovered to provide a concentrated product acid.

According to a particular embodiment of our invention, we have found that it is possible according to our invention to heat the acid to the boiling point of metaphosphoric acid at about 650° C., when the concentration reaches about 86% by weight $P_2O_5$, whereupon phosphoric acid distils over. According to this embodiment the evaporator, or the last evaporator, if, as is preferred, a cascade systems is being used, operates at a sufficiently high temperature to distil phosphoric acid which may be passed into a condenser or scrubber for collection as a highly purified product acid. The residual acid constitutes a second product of intermediate purity, which may be separately recovered.

Polyphosphoric acids obtained according to our invention may be crystallised as such, after separation of solid impurities or, preferably diluted to concentrations corresponding to orthophosphoric or pyrophosphoric acids, which may be crystallised from the system, after removal of the impurities, e.g. by decantation or, preferably, filtration. Crystallisation of orthophosphoric acid may be effected between $P_2O_5$ concentrations by weight of 68.64% and 75.4% preferably 70 to 74% e.g. 72.5%, or as the monohydrate at concentrations down to 47%. Concentrations below 58% require cooling below 0° C. Pyrophosphoric acid is crystallisable between 75.4% $P_2O_5$ and about 83% $P_2O_5$, preferably 74 to 81% e.g. 80%. At higher concentrations higher polyphosphoric acids may be crystallised. Alternatively the polyphosphoric or diluted acid may be neutralised wholly or partially with a suitable base to form poly-, pyro- or ortho-phosphates. Neutralisation may be effected before or after separation of the impurities. The base is preferably a hydroxide or carbonate of an alkali metal e.g. lithium or, most preferably sodium or potassium or of ammonium and may be added as an aqueous solution. The aqueous base reacts with polyphosphoric acids to form polyphosphates or with diluted acid, which has had time to equilibrate with the added water, to form ortho- and/or pyro- phosphates according to the concentration of the acid. Other phosphates may also be prepared according to the invention by adding the oxide, hydroxide or carbonate of an appropriate metal, e.g. alkaline earth metals such as calcium, barium or strontium or copper, chromium, nickel, zinc, aluminium or ferrous or ferric iron, or an organic base such as an amine e.g. ethanolamine. Where an insoluble or sparingly soluble phosphate is involved it is naturally preferred to separate the impurities prior to neutralisation, and to recover the product by crystallisation and/or filtration.

It is possible to concentrate the acid to a concentration corresponding to a condensed phosphoric acid, e.g. pyrophosphoric and either, after separation of the impurities, crystallise the appropriate acid, or carry out the neutralisation as hereinbefore described to obtain the appropriate condensed phosphate. However, in the case of pyrophosphoric acid, it is preferred to concentrate the wet process acid initially to concentrations above 82% $P_2O_5$ and then dilute back to about 80% $P_2O_5$. Neutralisation of acid equilibrated with water at intermediate concentrations (e.g. between 73 and 79% $P_2O_5$) may be used to prepare mixed phosphates.

Neutralisation and dilution may also be effected simultaneously by adding aqueous base directly to the polyphosphoric acids to form a polyphosphate product.

The diluted and filtered acid may alternatively be sold as an intermediate purity phosphoric acid product of higher quality, and therefore wider utility, than the feed. It is also possible to use the concentrated acid, after separation from solid impurities, as a catalyst, without further dilution.

Figure 2:
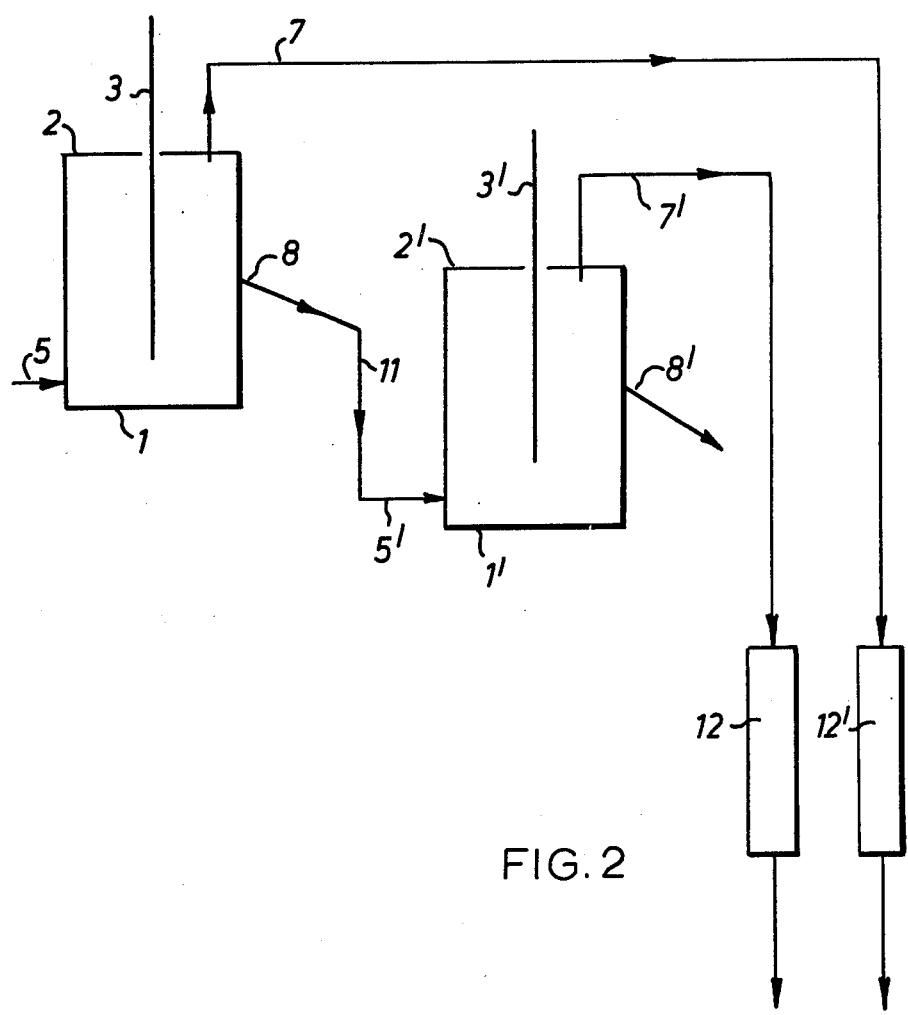

A typical cascade for use according to the invention will be described with reference to the accompanying drawings of which FIG. 1 is a sectional elevation of one cell for use in the invention and FIG. 2 is diagrammatic flow sheet of a cascade of two cells.

The apparatus comprises two graphite vessels (1), (1') each provided with an inlet feed pipe, (5),(5') respectively, and a graphite lid, (2),(2'). The lids (2),(2') each have a graphite electrode rod, (3),(3') respectively, projecting vertically through the centre and downwards into the vessel, (1),(1') respectively, and insulated from the lid by a refractory sheath, (4). Each lid (2),(2') is also provided with a temperature sensor, (6), and a vapour outlet duct, (7),(7') respectively. Each vessel (1),(1') is provided with a product outlet duct, (8),(8') respectively, opening at a point intermediate between the top and bottom of the vessel. The vessels (1),(1') and electrodes (3),(3') are each provided with water cooled copper clips, (9) for connection to a power supply (not shown). The product outlet duct (8) of the vessel (1) communicates via a line (11) with the inlet feed pipe (5') of the vessel (1'). The vapour outlets (7),(7') are provided with separate condensers, (12),(12') respectively.

To prevent leakage the vessels (1),(1') may be sealed externally with a resin bonded cement of crushed anthracite and powered quartz and encased in a stainless steel jacket (not shown).

In use, feed acid is run continuously into the vessel (1) through the inlet feed pipe (5) to form a pool of acid (10) whose depth is determined by the height of the product outlet duct (8). Intermediate product acid passes through the outlet duct (8) and via the line (12) to the inlet feed pipe (5') and enters the vessel (1'). Product acid is discharged continuously through the product outlet duct (8'). Electric current (e.g. a single phase 40 volt 600 amp. current) is passed between the electrodes (3),(3') and the vessels (1),(1') respectively. The acid in the pools (10) is heated and the vapour is recovered through the vapour outlet ducts (7),(7') and passed through the condensers (12),(12') as fluorine rich and phosphorus rich condensates respectively. Typically the acid in the pool (10) may be heated to a temperature between 200° C. and 400° C. e.g. 300° C. in the vessel (1) and that in the vessel (1') to a temperature of from 400° to 650° C., e.g. 550° C.

EXAMPLE 1

Feed acids were prepared by two stage counter-current extraction of wet process acid with methyl isobutyl ketone, counter-current scrubbing of the organic extract with water, followed by two stage counter-current release of $P_2O_5$ into water.

To test the removal of impurities at increasing levels of concentration of acid, a feed acid was concentrated at increasing temperatures in a single cell as described hereinbefore, with reference to FIG. 1 of the drawings. The composition of the feed and product acids are given in the following table 1.

TABLE 1

| Temperature, °C. | Kwh/Kg | ppm Suspended carbon | % P$_2$O$_5$ | ppm SO$_4$ | ppm F | ppm As | ppm organics Filt | Non-Filt |
|---|---|---|---|---|---|---|---|---|
| 20 | — | — | 60.0 | 9930 | 166 | 6.06 | 82 | |
| 250 | 0.325 | 145 | 73.4 | 8127 | 93 | 7.30 | 25 | 139 |
| 300 | 0.400 | 319 | 75.3 | 6160 | 80 | 6.49 | 21 | 260 |
| 340 | 0.417 | 320 | 76.5 | 4575 | 71 | 7.08 | 15 | 239 |
| 380 | 0.508 | 290 | 78.2 | 2786 | 54 | 6.87 | <15 | 244 |
| 240 | 0.627 | 422 | 79.9 | 904 | 35 | 8.02 | <15 | 347 |
| 460 | 0.701 | 710 | 81.1 | 185 | 23 | 6.75 | <15 | 651 |
| 500 | 0.953 | 903 | 82.3 | <100 | 13 | 6.07 | <15 | 507 |

EXAMPLE 2

A concentrated acid according to example 1 containing 80% P$_2$O$_5$ was neutralised with a 49% potassium hydroxide solution to give an alkaline potassium polyphosphate with a mean polyphosphate chain length of 2.1. The main application is a builder for liquid detergents.

The reaction temperature was controlled at 540° C. and the pH controlled at 8–9. After neutralisation the product was adjusted to pH 11. The polyphosphate could then be simply filtered, through a candle filter at 20–50 psi.

The P$_2$O$_5$ distribution is given in table 2, with the chemical analysis.

TABLE 2

| P$_2$O$_5$ Distribution | | ppm SO$_4$ | ppm F | ppm Cl | ppm As | ppm organic C |
|---|---|---|---|---|---|---|
| ortho | 17% | 62 | 5.4 | 10 | 4.2 | 15 |
| pyro | 40% | | | | | |
| tripoly | 25% | ppm Zn | ppm Cu | ppm Pb | ppm Fe | |
| higher | 18% | 1 | 1 | 1 | 6 | |

EXAMPLE 3

A concentrated acid according to example 1 containing 80% P$_2$O$_5$ was diluted to a typical orthophosphoric acid concentration, of 60% P$_2$O$_5$. This acid was neutralised with a 49% potassium hydroxide solution to give a dipotassium orthophosphate solution, which was easily filtered, through a candle filter.

The reaction temperature was controlled at 70° C. and the pH controlled at 7–9. The chemical analysis is given in table 3.

TABLE 3

| % P$_2$O$_5$ | ortho | >90% |
|---|---|---|
| SO$_4$ | ppm | 155 |
| F | " | 6.1 |
| Cl | " | 16 |
| As | " | 1.9 |
| organic C | " | 15 |
| Zn | ppm | 2 |
| Fe | " | 16 |
| Pb | " | 2 |
| Cu | " | 1 |

EXAMPLE 4

A concentrated acid prepared by the method of example 1 was dearsenefied by heating at various temperatures between 100° C. with sodium chloride. The initial concentration of arsenic was in excess of 10 ppm. The results are expressed in table 4.

TABLE 4

| ppm Cl (as NaCl) | Temperature °C. | Residence Time minutes | ppm As | ppm Cl |
|---|---|---|---|---|
| | 120 | 30 | 2.1 | |
| 1000 | 150 | 30 | 3.2 | |
| | 180 | 30 | 6.4 | |
| | 120 | 5 | <1 | 86 |
| 2000 | 150 | 5 | <1 | 5 |
| | 180 | 5 | 1.7 | 15 |

No comparable reduction in arsenic levels could be obtained by heating the initial feed acids with chloride.

EXAMPLE 5

A concentrated dearsenified acid preparation according to example 4 contained 0.05% w/w suspended carbon, giving the acid a black appearance. The acid was diluted to 63.5% P$_2$O$_5$ and filtered through a bed of diatomaceous earth on a terylene filter cloth to provide a clear high grade phosphoric acid. The result is shown in table 5.

TABLE 5

| | | Feed Acid | Re-diluted acid |
|---|---|---|---|
| P$_2$O$_5$ | % | 63.5 | 63.5 |
| SO$_4$ | ppm | 8750 | 114 |
| F | ppm | 140 | 18 |
| Cl | ppm | 10 | 10 |
| As | ppm | 18.7 | <1 |
| Organic C | ppm | 50 | 6 |
| Total C | ppm | | 7 |
| Si | ppm | | <10 |

EXAMPLE 6

Fractional Condensation

A cascade of two vessels as hereinbefore described with reference to the drawings was heated to the following temperatures:

| | | Sample No. |
|---|---|---|
| Pot (1) = 300° C. | Pot (2) = 400° C. | A |
| = 400° C. | = 500° C. | B |
| = 500° C. | = 600°–700° C. | C |

Vapours were condensed (using a glass condenser within a graphite column) from pot (2) only, at each of the given temperatures. No entrainment device was used.

The results obtained expressed in parts per million by weight, except where otherwise stated were as follows:

|       | A      | B      | C     | Feed Acid |
|-------|--------|--------|-------|-----------|
| P₂O₅ %| 3.11   | 8.91   | 44.8  | 53.6      |
| SO₄ % | 1.69   | 2.35   | 0.46  | 0.84      |
| F     | 5930   | 6270   | 1370  | 1225      |
| As    | 1.9    | 4.0    | 7.6   | 9.9       |
| Total C | 105  | 65     | 50    | 223       |
| Fe    | 45     | 29     |       | 0.174%    |
| Al    | 58     | 57     | 69    | 810       |
| Mg    | 25     | 6      | 31    | 0.380%    |
| B     | 30     | 29     | 42    | 36        |
| Ca    | 590    | 260    | 140   | 130       |
| Si    | 0.164% | 0.163% | 400   | 300       |
| Na    | 410    | 410    | 150   |           |
| V     | 2      | 1      | 2     | 231       |
| Ni    | 1      | 1      | 1     | 43        |
| Sn    | 1      | 1      | 1     |           |
| Cd    | 1      | 1      | 1     | 21        |
| Cr    | 3      | 1      | 5     | 374       |
| Zn    | 5      | 3      | 33    | 140       |
| Pb    | 8      | 1      | 1     | 3         |
| Cu    | 1      | 1      | 2     | 43        |

EXAMPLE 7

Neutralisation

A crude wet process acid was concentrated in a single cell as herein described with reference to FIG. 1 of the drawings, at about 450° C. to produce acid of 80.5% P₂O₅ concentration. Part of this acid was neutralised with 49% potassium hydroxide and then filtered without difficulty. The other part was diluted to ortho strength acid (e.g. 60% P₂O₅) and neutralised with 46% sodium hydroxide solution and again filtered without difficulty.

The results obtained were as follows:

|        | Wet Acid Feed | Re-diluted acid | monosodium phosphates | potassium pyrophosphate |
|--------|---------------|-----------------|------------------------|--------------------------|
| P₂O₅ % | 53.6          | 54.5            | 24.6                   | 22.6                     |
| SO₄    | 8390          | 410             | 310                    | 255                      |
| F      | 1225          | 225             | 49                     | 57                       |
| Cl     | 61            | 10              | 19                     | 15                       |

EXAMPLE 8

Crystallisation

A wet acid was heated to about 450° C., 80.5% P₂O₅ and then diluted and filtered to give a clear green acid of 56% P₂O₅ strength (Stage 1).

Crystals of thermal acid hydrate (0.3% w/w) were added to a sample of this re-diluted acid and stirred for 1 hour at −30° C. Crystals were separated from the mother liquid by centrifuge and filtration (Stage 2). The crystals were re-melted and this acid was re-crystallised at 15° C. using 0.3% w/w of solvent extracted acid hydrate crystals, for 5 minutes.

Results are as follows:

|       | ← Stage 1 → | | ← Stage 2 → | | ← Stage 3 → | |
|-------|---------------------|---|------------------|---|-----------------------|---|
|       | Starting-wet acid | Re-diluted wet acid | Decanted liquor | Crystals | Decanted liquor | Crystals |
| P₂O₅  | 53.6 | 57.3 | 56.0 | 63.9 | 63.2 | 65.2 |
| SO₄   | 8390 | 483  | 573  | 123  | 165  | 100  |

|       | ← Stage 1 → | | ← Stage 2 → | | ← Stage 3 → | |
|-------|---------------------|---|------------------|---|-----------------------|---|
|       | Starting-wet acid | Re-diluted wet acid | Decanted liquor | Crystals | Decanted liquor | Crystals |
| F     | 1225 | 123 | 140 | 35 | 42 | 8 |

EXAMPLE 9

A wet acid was heated to 510° C., 82.5% P₂O₅, and then diluted and filtered to give a clear green acid of 69.5% P₂O₅ strength. Crystals of thermal acid hydrate (0.1% w/w) were added to a sample of this rediluted acid and stood for 5 hours at 25° C. Crystals were separated from the mother liquor by centrifuge. The separated crystals comprised 46% by weight and the mother liquor 54% by weight of the re-diluted acid. Analyses are as follows (All figures in ppm except where stated otherwise).

|       | Starting Wet acid | Rediluted Wet acid | Crystals | Mother Liquor |
|-------|-------------------|---------------------|----------|----------------|
| P₂O₅  | 53.6%             | 70.1%               | 72.3%    | 68.25%         |
| SO₄   | 0.84%             | 570                 | 320      | 800            |
| F     | 0.12%             | 92                  | 49       | 127            |

EXAMPLE 10

A wet acid obtained by the acidulation of Florida rock was concentrated by heating to a temperature of 605° C. in a single cell as hereinbefore described with reference to the accompanying drawings. The acid was rediluted and filtered to give a product acid. The analysis of the initial wet acid and the product acid were as follows:

|       |     | Initial Wet Acid | Product Acid |
|-------|-----|------------------|--------------|
| P₂O₅  | %   | 54.1             | 52.6         |
| SO₄   | ppm | 29000            | <100 ppm     |
| F     | ppm | 2200             | 40           |
| Ex.C  | ppm | 4300             | 10           |
| Al    | ppm | 5800             | 570          |
| Fe    | ppm | 7600             | 3860         |
| Mg    | ppm | 4000             | 4640         |
| Ti    | ppm | 350              | 85           |
| Cr    | ppm | 85               | 35           |

What we claim is:

1. A method for the production of phosphatic derivatives of wet process phosphoric acid which comprises heating wet process phosphoric acid in carbon apparatus to evaporate water therefrom to leave a concentrated acid by direct electrical resistance heating by passing an alternating current through said wet process acid, until the concentration of said concentrated acid is above 80% by weight P₂O₅, precipitating solid impurities from said concentrated acid and separating the precipitated impurities.

2. A method according to claim 1 wherein the acid is at least partially neutralised, before or after separation of solid impurities, with a base capable of forming a water soluble salt of the acid.

3. A method according to claim 2 wherein the base is an aqueous solution of a carbonate or hydroxide of ammonium, sodium, potassium or lithium or an alkylolamine.

4. A method according to claim 2 or 3 wherein the concentrated acid is at least partially neutralised to form an aqueous solution of polyphosphates prior to separation of the solid impurities.

5. A method according to claim 2 or 3 wherein the aqueous acid is diluted to a $P_2O_5$ concentration corresponding to that of ortho- or pyrophosphoric acid or a mixture thereof, prior to neutralisation and separation from the solid impurities.

6. A method according to claim 1 which comprises continuously passing a dilute phosphoric acid successively through a plurality of evaporators heating the acid in each successive evaporator to progressively higher temperatures sufficient to evaporate water from the acid in each evaporator and to progressively increase the concentration of the acid and wherein at least the last evaporator comprises a carbon vessel provided with a carbon electrode and the acid is heated by passing an alternating current therethrough between the electrode and the vessel.

7. A method according to claim 6 wherein the acid in the final evaporator is concentrated to more than 82% by weight $P_2O_5$.

8. A method according to claim 6 or 7 wherein the vapour from at least the first evaporator is recovered separately from the vapour from at least the last evaporator.

9. A method according to claim 1 wherein the concentrated acid is diluted to form a diluted acid of less than 75% by weight, and the precipitated solid impurities are separated from said diluted acid to leave a product acid.

10. A method according to claim 9 wherein the concentrated acid is diluted to a concentration corresponding substantially to that of orthophosphoric acid and, after separation of the solid impurities, orthophosphoric acid is crystallised therefrom.

11. A method according to claim 9 wherein a solid, phosphoric or condensed phosphoric acid is recovered from the product acid by crystallisation.

12. A method according to claim 1, 9 or 11 wherein the acid is in a carbon vessel and is heated by passing alternating electric current through the acid between a carbon electrode and the carbon vessel.

13. A method according to claim 1, 9 or 11 wherein the concentrated acid is dearsenified by heating with chloride.

14. A method according to claim 1 wherein the acid is concentrated above 82% by weight $P_2O_5$.

15. A method according to claim 14 wherein the maximum concentration of $P_2O_5$ achieved during heating is up to 86% $P_2O_5$.

16. A method according to claim 1 wherein the wet process phosphoric acid is partially purified prior to heating.

17. A method according to claim 16 wherein the partial purification of the wet process acid is effected by solvent extraction.

18. A method according to claim 1 wherein wet process phosphoric acid is heated in a carbon vessel to evaporate water therefrom to leave a concentrated acid by direct electrical resistance heating by passing an alternating current through said acid between at least one carbon electrode and said carbon vessel, until the concentration of said concentrated acid is 80–86% by weight $P_2O_5$, precipitating solid impurities from said concentrated acid, diluting said concentrated acid to form a diluted acid of below 75% concentration, separating the precipitated solid impurities from said diluted acid to leave a product acid, crystallizing ortho phosphoric acid from said product acid, and separating crystals of said ortho phosphoric acid from mother liquor.

19. A method according to claim 18 wherein anhydrous ortho phosphoric acid is crystallized.

20. A method according to claim 1 wherein the acid is heated above 500° C.

21. A method according to claim 20 wherein the acid is heated to from 550° to 650° C.

22. A method according to claim 1 wherein after separation from solid impurities and before, after, or without dilution, the acid is at least partially neutralised with a base capable of forming insoluble phosphates, and the insoluble phosphates are recovered from the neutralised acid.

23. A method according to claim 1 wherein phosphoric acid is heated to a temperature of at least 650° C. and a distilled product acid is recovered from the vapour.

24. A method according to claim 1 wherein the wet process acid is concentrated to a $P_2O_5$ concentration corresponding substantially to that of a condensed phosphoric acid and, after separation of the solid impurities, the concentrated acid is crystallised.

25. A method according to claim 1 wherein the acid is concentrated to above 82% $P_2O_5$ and then diluted to a concentration corresponding substantially to pyrophosphoric acid and, after separation of the solid impurities, pyrophosphoric acid is crystallised therefrom.

* * * * *